Figure 1:
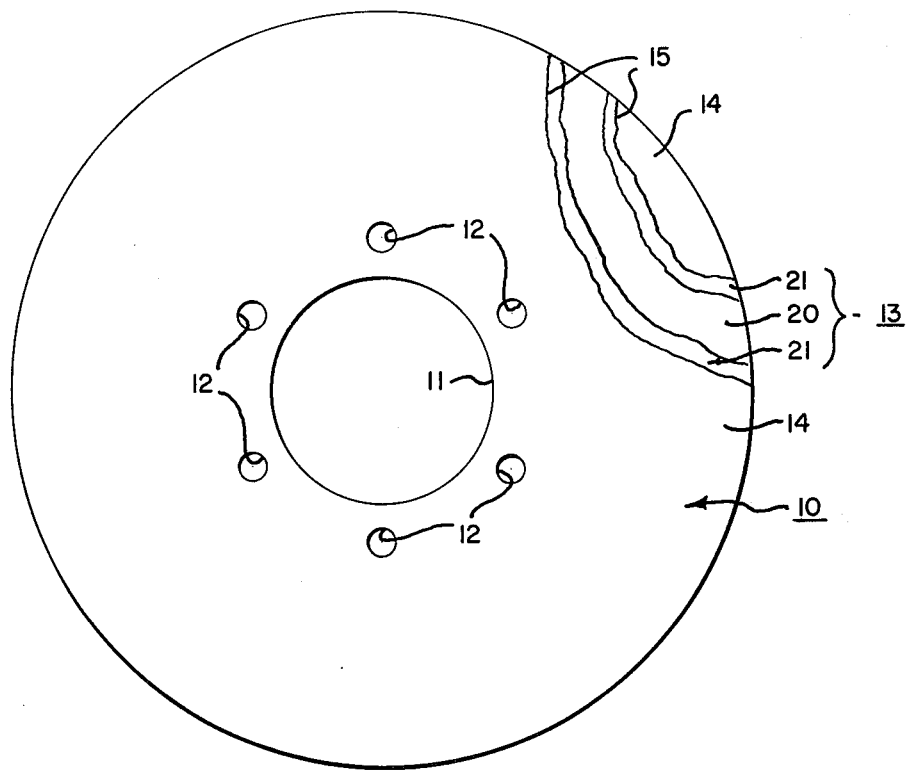

United States Patent [19]

Buell

[11] 4,049,090
[45] Sept. 20, 1977

[54] BRAKE DISCS

[76] Inventor: Erik F. Buell, Box 418, R.D. No. 2, Gibsonia, Pa. 15044

[21] Appl. No.: 741,608

[22] Filed: Nov. 15, 1976

Related U.S. Application Data

[63] Continuation-in-part of Ser. No. 611,621, Sept. 9, 1975, abandoned.

[51] Int. Cl.$^2$ .............................................. F16D 69/02
[52] U.S. Cl. ............................ 188/251 M; 192/107 M
[58] Field of Search .......... 188/73.2, 251 M, 218 XL; 192/107 M

[56] References Cited

U.S. PATENT DOCUMENTS

| | | | |
|---|---|---|---|
| 2,822,218 | 2/1958 | Whitfield | 188/251 M |
| 2,833,668 | 5/1958 | Dailey et al. | 188/251 M |
| 3,261,724 | 7/1966 | Ulam | 148/34 X |
| 3,724,613 | 4/1973 | Bermingham | 188/218 XL |

FOREIGN PATENT DOCUMENTS

| | | | |
|---|---|---|---|
| 677,144 | 8/1952 | United Kingdom | 188/218 R |
| 816,169 | 7/1959 | United Kingdom | 188/251 M |

Primary Examiner—George E. A. Halvosa
Attorney, Agent, or Firm—Buell, Blenko & Ziesenheim

[57] ABSTRACT

A brake disc for vehicles is provided to reduce unsprung weight and improve thermal dissipation comprising a core of aluminum alloy clad with stainless steel sheets bonded on each side to form an integral disc.

5 Claims, 2 Drawing Figures

U.S. Patent    Sept. 20, 1977    4,049,090

BRAKE DISCS

This application is a continuation-in-part of my co-pending application Ser. No. 611,621, filed Sept. 9, 1975, now abandoned.

This invention relates to brake discs and particularly to light weight, high thermal transfer, abrasion resistant brake discs especially for racing vehicles and the like.

The problem of excessive unsprung weight in racing vehicle wheels and of overheating of brakes in racing vehicles are very well known to motorcyle as well as automobile race drivers, mechanics and designers. It has long been recognized that removal of even a few ounces of unsprung weight was of tremendous advantage. Discs for disc brakes have been generally made of cast iron, cast steel or from a steel forging. Such discs must be strong and resistant to the abrasive wear of the brake pads or "pucks" which engage them during braking. Such brake pads or pucks, as well known in the automotive and motorocycle industries, are small in circumferential extent relative to the brake disc and engage the disc on opposite sides over an area less than the circumferential disc surface. Such brake discs are also subject to very substantial heating, particularly during racing, and frequently run at low red heat. This affects their braking efficiency greatly. These problems are well known and yet no one has provided a satisfactory solution to them.

I have discovered a brake disc which solves all of these problems. It is light in weight, has high thermal transfer characteristics and is higly resistant to the wear and abrasion of the brake pucks.

I provide a brake disc having a high-strength aluminum alloy core and stainless steel wear faces laminated thereto on each side of the core and bonded by an intermetallic bond. The stainless steel wear faces are preferably each about 10% of the total thickness of the brake disc, but not less than about 20 thousands of an inch thick.

The aluminum core must be formed of an aluminum alloy having high strength and preferably hardenable such as 2024 T-6, 6061 T-6 fully coated on both sides by a thin layer of substantially pure aluminum such as Type 1145 onto which the stainless steel faces are laminated by a process of oxide removal, heating and rolling such as is described in Ulam U.S. Pat. Nos. 3,210,840 and 3,261,724. I originally made what appeared to be satisfactory brake discs using a core of Type 1100 aluminum laminated directly to the stainless steel faces as disclosed in the above mentioned Ulam patents. I have discovered, however, that such discs are not satisfactory, but, on the contrary, after continued use many develop surface irregularities which continue to become more severe with use. The reason for this is not presently known but is believed to be related to a rapid overheating and movement of metals on application of the brakes. This does not occur on all such disc but does occur spontaneously at random in discs using substantially pure aluminum. It does not appear where a high strength or hardenable aluminum alloy is used as the core. Preferably the stainless steel is one which is relatively hard and resistant to abrasion, such as 304.

I have found that if the stainless steel surface laminations go below about 20 thousands of an inch in thickness, the discs lose rigidity and resistance to surface damage to a degree which makes them generally unsatisfactory for use in brakes. I have also found that the stainless steel faces must be bonded to the aluminum by means of a diffusion bond between separate sheets of aluminum alloy and stainless steel as described in the aforementioned Ulam patents in order to avoid separation of the stainless steel faces from the aluminum core. For example, I have found that metal spraying stainless steel onto the aluminum core does not produce a satisfactory product because the heat and pressure involved in braking causes separation between the stainless steel and aluminum and the stainless steel tends to tear away in pieces, apparently lacking the integrity of a laminated sheet as in this invention.

Figure 2:
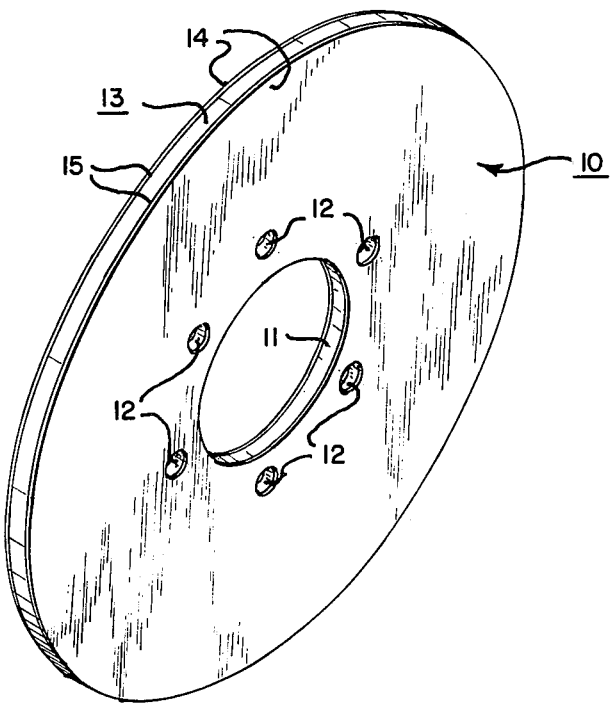

In the foregoing general description of my invention I have set out certain objects, purposes and advantages attained by it. Other purposes, advantages and objects will be apparent from a consideration of the following description and the accompanying drawings in which:

FIG. 1 is a plan view of a preferred brake disc according to my invention partly broken away; and FIG. 2 is an isometric view of the brake disc of this invention.

Referring to the drawings, I have illustrated a typical brake disc according to my invention for use in a motorcycle. The particular disc 10 is 12 inches in diameter and ¼ inch thick (0.250 inch) with a center hole 11, 3 inches in diameter surrounded by six bolt holes 12 for fastening to a brake spider, not shown. The disc 10 is made up of an aluminum alloy core 13 approximately 0.200 inch thick with stainless steel facing sheets 14, each approximately 0.025 inch thick bonded together with an area of diffusion bonding 15 of indeterminate thickness. The disc is preferably made by laminating an aluminum alloy core sheet 20 of high strength, hardenable aluminum alloy having a thin coating of substantially pure aluminum 21 on each side to make up the core 13 between two sheets of stainless steel 14 such as 304 stainless or harder grade by the methods described in the Ulam patents identified above.

Brake discs according to this invention have been made in a variety of configurations and diameters for different vehicles and have proven to be remarkedly efficient in reducing the unsprung wheel weight and in dissipating heat as well as having excellent wear characteristics comparable to the solid steel discs of the prior art.

While I have set out certain presently preferred embodimetns of practice of my invention in the foregoing specification, it will be obvious that this invention may be otherwise embodied within the scope of the following claims.

I claim:

1. In a vehicle disc brake assembly including a brake disc and a pair of brake pads engaging opposite sides of said disc over an area less than the circumferential disc surface the improvement comprising a brake disc providing a reduction in unsprung weight and improved thermal dissipation consisting essentially of a circular core from the group consisting of high strength and hardenable aluminum alloys forming the major thickness component and having substantially parallel spaced sides clad with stainless steel sheets applied in sheet form fully covering each parallel side of said core, said stainless steel sheets bonded thereto with a diffusion bond of aluminum and stainless steel forming an integral disc.

2. In a brake disc assembly as claimed in claim 1 wherein the stainless steel sheets are each about 10% of the total thickness of the brake disc.

3. In a brake disc assembly as claimed in claim 1 wherein the stainless steel sheets are each at least 0.020 inch thick.

4. In a brake disc assembly as claimed in claim 1 wherein the core is a high strength hardenable aluminum alloy having a surface coating of substantially pure aluminum.

5. In a brake disc assembly as claimed in claim 1 wherein the stainless steel sheets are each about 10% of the total thickness of the brake disc but not less than 0.020 inch thick.

* * * * *